United States Patent
Alecu et al.

(10) Patent No.: US 12,123,305 B2
(45) Date of Patent: Oct. 22, 2024

(54) SPLIT PISTON RING SEAL FOR A ROTATING ASSEMBLY AND METHOD OF SEALING

(71) Applicant: Pratt & Whitney Canada Corp., Longueuil (CA)

(72) Inventors: Daniel Alecu, Brampton (CA); Ivan Sidorovich Paradiso, Toronto (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/993,517

(22) Filed: Nov. 23, 2022

(65) Prior Publication Data

US 2024/0167389 A1    May 23, 2024

(51) Int. Cl.
*F01D 11/00* (2006.01)
*F01D 5/02* (2006.01)
*F01D 5/30* (2006.01)

(52) U.S. Cl.
CPC ............ *F01D 11/003* (2013.01); *F01D 5/025* (2013.01); *F01D 5/30* (2013.01); *F05D 2220/32* (2013.01); *F05D 2240/20* (2013.01); *F05D 2240/55* (2013.01)

(58) Field of Classification Search
CPC .......... F01D 11/003; F01D 5/025; F01D 5/30; F05D 2220/32; F05D 2240/20; F05D 2240/55; F05D 2240/58; F02C 7/28
See application file for complete search history.

(56) References Cited

U.S. PATENT DOCUMENTS

| | | | |
|---|---|---|---|
| 2,970,023 A | | 1/1961 | Thompson |
| 3,743,303 A | * | 7/1973 | Pope ............... F16J 15/441 277/928 |
| 5,050,892 A | | 9/1991 | Kawai |
| 5,660,398 A | * | 8/1997 | Terao ............... F16J 9/14 92/162 R |
| 6,428,014 B2 | | 8/2002 | Scarlett |
| 7,291,947 B2 | * | 11/2007 | Hashiba ............ H02K 9/20 310/90 |

(Continued)

FOREIGN PATENT DOCUMENTS

| | | |
|---|---|---|
| EP | 2166259 A1 | 3/2010 |
| WO | 2004053365 A1 | 6/2004 |

OTHER PUBLICATIONS

EP Search Report for EP Patent Application No. 23211748.1 dated Mar. 25, 2024.

(Continued)

*Primary Examiner* — Brian Christopher Delrue
(74) *Attorney, Agent, or Firm* — Getz Balich LLC (57) ABSTRACT

A gas turbine engine rotor assembly is provided that includes a shaft, a rotor, and a seal assembly. The seal assembly is configured to seal between a first and second rotor compartments on opposite sides of the seal assembly. The seal assembly includes a seal groove and a split piston ring seal. The split piston ring seal is configured such that air in the first rotor compartment at P1 produces a radial force acting on the split piston ring seal, and air in the second rotor compartment at P2 produces a second force acting on the split piston ring seal, wherein the second force is directed radially inward and the first force is directed radially outward, and the second force is greater than the first force.

15 Claims, 7 Drawing Sheets

(56) References Cited

U.S. PATENT DOCUMENTS

| | | | |
|---|---|---|---|
| 7,992,694 B2 | 8/2011 | Krause | |
| 8,100,403 B2* | 1/2012 | Short | F16J 15/442 |
| | | | 277/390 |
| 9,850,770 B2* | 12/2017 | Garrison | F16J 15/442 |
| 10,487,947 B2 | 11/2019 | Gronitzki | |
| 10,520,096 B2* | 12/2019 | Munson | F16J 15/4476 |
| 10,563,530 B2* | 2/2020 | Wotzak | F02C 7/28 |
| 10,598,035 B2* | 3/2020 | Snow | F01D 25/183 |
| 10,619,742 B2* | 4/2020 | Miller | F01D 25/183 |
| 2006/0216143 A1* | 9/2006 | Trinks | F01D 25/246 |
| | | | 415/173.1 |
| 2010/0066027 A1* | 3/2010 | Vasagar | F16J 15/441 |
| | | | 277/350 |
| 2012/0261887 A1* | 10/2012 | Vasagar | F16J 15/441 |
| | | | 277/543 |
| 2013/0069313 A1 | 3/2013 | Sonokawa | |
| 2013/0119614 A1 | 5/2013 | Antunes De Oliveira | |
| 2017/0362949 A1* | 12/2017 | Von Berg | F16J 15/24 |
| 2020/0025097 A1* | 1/2020 | DiFrancesco | F01D 11/001 |
| 2020/0056506 A1* | 2/2020 | Stoyanov | F01D 25/183 |
| 2020/0291861 A1 | 9/2020 | Bintz | |
| 2021/0023638 A1 | 1/2021 | Jean | |
| 2021/0062669 A1* | 3/2021 | Chuong | F01D 11/003 |
| 2021/0087933 A1 | 3/2021 | Ing | |
| 2022/0259975 A1* | 8/2022 | Heyerman | F01D 11/006 |
| 2022/0282631 A1* | 9/2022 | Maalouf | F01D 5/025 |
| 2023/0184122 A1* | 6/2023 | Miller | F01D 25/16 |
| | | | 415/110 |
| 2024/0077031 A1* | 3/2024 | Miller | F02C 7/28 |

OTHER PUBLICATIONS

Fritz Klocke: "Developments in Wire-EDM for the Manufacturing of Fir Tree Slots in Turbine Discs Made of Inconel 718", Key Engineering Materials (vols. 504-506), Feb. 3, 2012 (Feb. 3, 2012), pp. 1177-1182, XP093167321.

S. Sarkar: "A novel method of determination of wire lag for enhanced profile accuracy in WEDM", Precision Engineering, vol. 35, No. 2, Apr. 1, 2011 (Apr. 4, 2011), pp. 339-347, XP093167507.

Sanchez et al.: "On the influence of cutting speed limitation on the accuracy of wire-EDM corner-cutting", Journal of Materials Processing Technology, Elsevier, NL, vol. 182, No. 1-3, Nov. 8, 2006 (Nov. 8, 2006), pp. 574-579, XP005753436.

EP Search Report for EP Patent Application No. 23219519.8 dated Jun. 13, 2024.

EP Search Report for EP Patent Application No. 23211748.1 dated Jul. 16, 2024.

* cited by examiner

SPLIT PISTON RING SEAL FOR A ROTATING ASSEMBLY AND METHOD OF SEALING

BACKGROUND OF THE INVENTION

1. Technical Field

Exemplary embodiments of the present disclosure pertain to the art of gas turbine engines, and in particular to sealing or isolating adjacent cavities of a gas turbine engine.

2. Background Information

Many seals are utilized in gas turbine engines to isolate various parts of the gas turbine engine. One example of a sealing location is in a high speed rotor of the gas turbine engine, where a piston ring seal is utilized to seal between a tie shaft and a rotor disc, to isolate adjacent cavities. During operation of the gas turbine engine, the tie shaft and the rotor disc experience relative motion, such as relative axial or radial motion, due to operating conditions such as pressure, temperature and centrifugal forces. The piston ring seal is a split ring, which cannot support its own weight under expected centrifugal loading and therefore must transfer that force to the rotor disc radially outboard of the piston ring seal. In some applications, the centrifugal force acting on the piston ring seal is large enough that axial movement of the piston ring seal is undesirably inhibited.

What is needed is a piston ring seal that provides an improvement over prior art piston ring seals.

SUMMARY

According to an aspect of the present disclosure, a gas turbine engine rotor assembly is provided that includes a shaft, a rotor, and a seal assembly. The shaft is rotatable about an axis and has an outer shaft surface. The rotor surrounds the shaft and is rotatable with the shaft about the axis. The rotor has an axially extending inner rotor surface. The seal assembly is configured to seal between a first rotor compartment (FRC) disposed between the shaft and the rotor on a first side of the seal assembly, and a second rotor compartment (SRC) disposed between the shaft and the rotor on a second side of the seal assembly, the second side of the seal assembly being axially opposite the first side of the seal assembly. During operation of the gas turbine engine rotor assembly, air is disposed in the FRC at a pressure P1 and air is disposed the SRC at a pressure P2, where P2 is greater than P1. The seal assembly includes a seal groove and a split piston ring seal. The seal groove is disposed radially into the outer shaft surface. The seal groove has first and second lateral surfaces spaced apart from one another, and a base surface extending between the first and second lateral surfaces. The seal groove has a width and a depth. The split piston ring seal has a first lateral member configured for engagement with the inner rotor surface, and a second lateral member configured to be at least partially disposed within the seal groove. The split piston ring seal is configured such that air disposed in the FRC at P1 produces a first axial force (FAF) acting on the split piston ring seal, and air disposed in the SRC at P2 produces a second axial force (SAF) acting on the split piston ring seal, wherein the SAF is directed opposite to the FAF and the SAF is greater than the FAF. The split piston ring seal is configured such that air disposed in the FRC at P1 produces a first radial force (FRF) acting on the split piston ring seal, and air disposed in the SRC at P2 produces a second radial force (SRF) acting on the split piston ring seal, wherein the SRF is directed radially inward and the FRF is directed radially outward, and the SRF is greater than the FRF.

In any of the aspects or embodiments described above and herein, the first lateral member may include a first side surface (FLMFSS), a second side surface (FLMSSS), an outer radial surface (FLMORS) that extends between the FLMFSS and the FLMSSS.

In any of the aspects or embodiments described above and herein, the second lateral member may include a first side surface (SLMFSS), a second side surface (SLMSSS), and an inner radial surface (SLMIRS) that extends axially between the SLMFSS and the SLMSSS.

In any of the aspects or embodiments described above and herein, the split piston ring seal may further include a center member having a first lateral end and a second lateral end, and the first lateral member extends outwardly from the center member at the first lateral end, and the second lateral member extends outwardly from the center member at the second lateral end.

In any of the aspects or embodiments described above and herein, the split piston ring seal may be configured such that the FLMFSS of the first lateral member, and the inner radial surface of the center member are exposed to the air disposed in the FRC at said pressure P1.

In any of the aspects or embodiments described above and herein, the split piston ring seal may be configured such that the SLMSSS of the second lateral member, and the outer radial surface of the center member are exposed to the air disposed in the SRC at said pressure P2.

In any of the aspects or embodiments described above and herein, the second lateral member may include a first side surface (SLMFSS), a second side surface (SLMSSS), and an inner radial surface (SLMIRS) that extends axially between the SLMFSS and the SLMSSS.

In any of the aspects or embodiments described above and herein, the first lateral member may include a first side surface (FLMFSS), a transverse surface (FLMTS), an outer radial surface (FLMORS) that extends between the FLMFSS and the FLMTS, and the FLMTS extends between the FLMORS and the SLMSSS.

In any of the aspects or embodiments described above and herein, the FLMTS may extend between the FLMORS and the SLMSSS at an angle greater than zero degrees and less than ninety degrees relative to the FLMORS.

In any of the aspects or embodiments described above and herein, the FLMTS may include a plurality of sections, each disposed at an angle greater than zero degrees and less than ninety degrees relative to the FLMORS.

According to an aspect of the present disclosure, a split piston ring seal is provided that includes a first lateral end, a second lateral end opposite the first lateral end, a first lateral member having an outer radial surface disposed at the first lateral end, and a second lateral member having an inner radial surface disposed at the second lateral end, the second lateral member extending outwardly relative to the first lateral member.

In any of the aspects or embodiments described above and herein, the split piston ring seal may further include a center member extending between the first lateral end and the second lateral end. The first lateral member may extend outwardly from the center member at the first lateral end, and the second first lateral member may extend outwardly from the center member at the first lateral end.

According to an aspect of the present disclosure, a method of sealing between a first rotor compartment (FRC) disposed between a shaft and a rotor, and a second rotor compartment (SRC) disposed between the shaft and the rotor is provided. The method includes: a) providing a seal assembly configured to seal between the FRC and the SRC, the seal assembly including a seal groove disposed radially into an outer shaft surface of the shaft, and a split piston ring seal having a first lateral member configured for engagement with an inner rotor surface of the rotor, and a second lateral member configured to be at least partially disposed within the seal groove; and b) providing air in the FRC at a pressure P1 and air in the SRC at a pressure P2, where P2 is greater than P1. The split piston ring seal is configured such that for the difference in pressure between P2 and P1, the air pressure P1 in the FRC produces a first radial force (FRF) acting on the split piston ring seal, and air pressure P2 in the SRC produces a second radial force (SRF) acting on the split piston ring seal, wherein the SRF is directed radially inward and the FRF is directed radially outward, and the SRF is greater than the FRF.

In any of the aspects or embodiments described above and herein, the split piston ring seal further may include a first lateral end, a second lateral end, and a center member extending between the first lateral end and the second lateral end. The first lateral member extends outwardly from the center member at the first lateral end, and the second first lateral member extends outwardly from the center member at the first lateral end.

In any of the aspects or embodiments described above and herein, the split piston ring seal may be configured such that the FLMFSS of the first lateral member, and the inner radial surface of the center member are exposed to the air disposed in the FRC at said pressure P1, and the SLMSSS of the second lateral member, and the outer radial surface of the center member are exposed to the air disposed in the SRC at said pressure P2.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
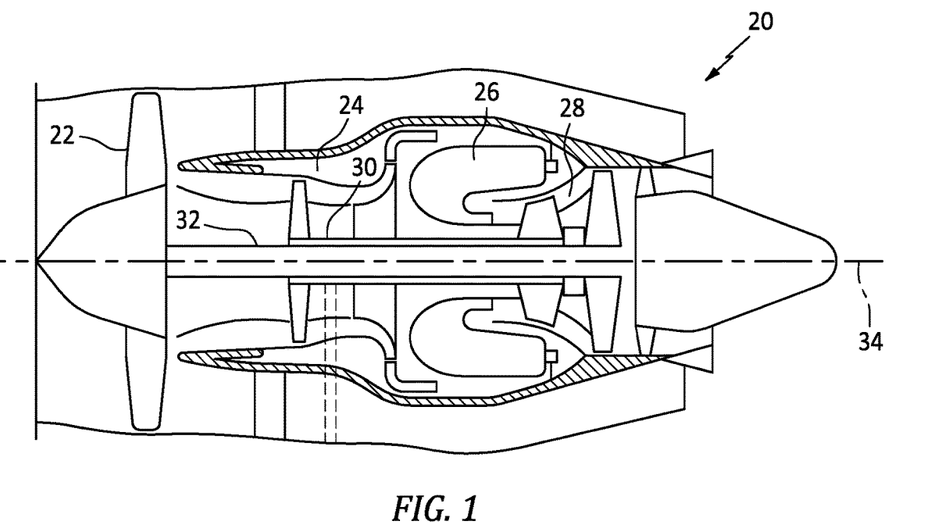
FIG. 1 is a diagrammatic sectional view of a gas turbine engine.

FIG. 1 illustrates an exemplary gas turbine engine 20 of a type preferably provided for use in subsonic flight. The engine 20 includes a fan 22 through which ambient air is propelled, a compressor section 24 for pressurizing the air, a combustor 26 in which the compressed air is mixed with fuel and ignited for generating an annular stream of hot combustion gases, and a turbine section 28 for extracting energy from the combustion gases. A high pressure section (HPT) of the turbine section is drivingly engaged with a high pressure section (HPC) compressor section through a high pressure shaft 30. A low pressure section (LPT) of the turbine section is drivingly engaged with low pressure sections (LPC) of the compressor section through a low pressure shaft 32 extending within the high pressure shaft 30 and rotating independently therefrom. In some embodiments, the LPT may also be drivingly engaged with the fan 22 directly, or indirectly through a geared architecture. The central axis 34 of the gas turbine engine 20 is typically also the central axis of the gas path through the engine 20; e.g., an annular gas path is typically symmetrical about the engine central axis 34. To facilitate the description herein, the present disclosure will be described in terms of a gas path central axis coincident with an engine central axis, but the present disclosure is not limited to this embodiment. The present disclosure may be used within conventional through-flow engines, or reverse flow engines, and gas turbine engine types such as turbofan engines, turboprop engines, turboshaft engines, and the like. The terms "upstream" and "downstream" used herein refer to the direction of an air/gas flow passing through an annular gas path of the gas turbine engine. It should also be noted that the terms "radial" and "circumferential" are used herein with respect to a central axis of the gas turbine engine 20.

Figure 2:
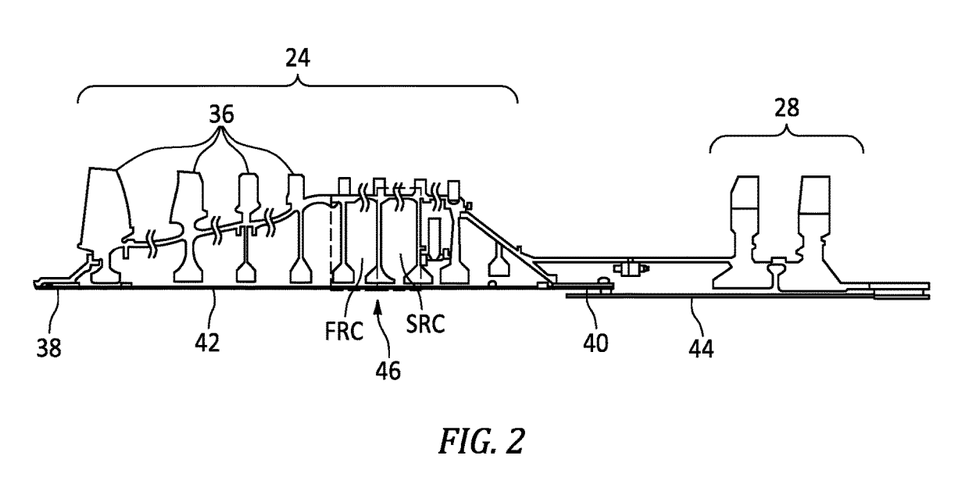
FIG. 2 is a diagrammatic view of an embodiment of a spool with a compressor and a turbine.
Figure 3:
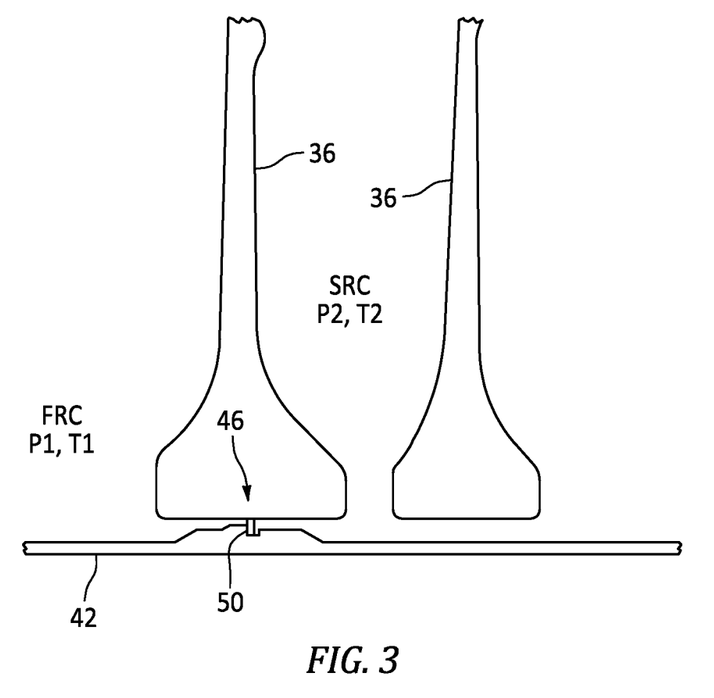
FIG. 3 is an enlarged portion of FIG. 3, illustrating a seal assembly disposed relative to a compressor rotor.
Figure 4:
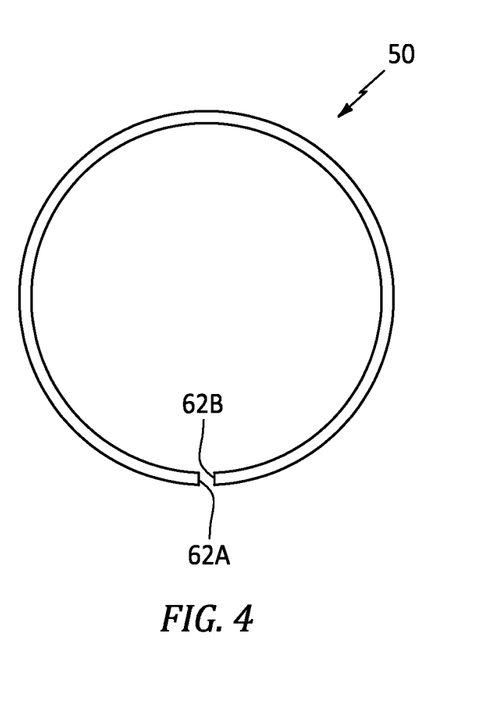
FIG. 4 is a diagrammatic end view of a piston ring embodiment.

FIG. 2 illustrates a diagrammatic view of an embodiment of a spool with a compressor 24 and a turbine 28. The compressor 24 includes a plurality of compressor rotors 36 located between a forward compressor hub 38 and an aft compressor hub 40. A tie shaft 42 extends radially inboard of the compressor rotors 36 and engages the forward compressor hub 38 and the aft compressor hub 40. The tie shaft 42 and the compressor rotors 36 are rotationally driven about the central axis 34 of the engine 20. In some embodiments, a turbine tie shaft 44 extends radially inboard of turbine rotors of the turbine 28 and engages the compressor tie shaft 42.

The structure defines at least two compartments between the compressor tie shaft and the compressor rotors, for example, a first rotor compartment (FRC) and a second rotor compartment SRC). It may be desired to isolate the FRC from the SRC, and thus a seal assembly 46 is located at a compressor rotor 36 and extends between the compressor rotor 36 and the tie shaft 42. The seal assembly 46 is shown located at a particular compressor rotor 36. However, one skilled in the art will readily appreciate that the seal assembly 46 may be located at other locations along the tie shaft 42, for example other compressor rotors 36, and that in some embodiments multiple seal assemblies 46 may be utilized.

Referring to FIGS. 3-6, in some embodiments the seal assembly 46 may include a seal groove 48 disposed within the tie shaft 42 that is configured to receive one or more piston ring seals 50. The seal groove 48 may be defined by a first lateral surface 52, a second lateral surface 54, and a base surface 56 that extends between the first and second lateral surfaces. The first lateral surface 52 extends a first distance (D1) between the base surface 56 and a first outer radial surface 58. The second lateral surface 54 extends a second distance (D2) between the base surface 56 and a second outer radial surface 60. The first distance may be greater than the second distance (D1>D2). The first and second lateral surfaces 52, 54 are axially spaced apart from one another by an axial distance W. In the example shown in FIGS. 3-6, the seal groove 48 is integrally formed within the tie shaft 42. The present disclosure is not limited to this particular configuration. For example, the seal groove 48 may be disposed within a shuttle that is independent of the tie shaft 42 but in communication with the tie shaft 42.

The seal assembly 46 includes at least one piston ring seal 50 configured for sealing between a compressor component (e.g., a compressor rotor 36) and the compressor tie shaft 42. The piston ring seal 50 extends circumferentially in a hoop-like manner and includes a split defined by two opposing circumferential ends 62A, 62B (see FIG. 4), thereby making the piston ring seal 50 circumferentially discontinuous. In the nonlimiting example shown in FIGS. 3-5A, the piston ring seal 50 is shown in sealing engagement with the inner bore surface of the compressor rotor 36 and a surface of the tie shaft seal groove 48. To facilitate the description herein, the compressor component will be referred to as a compressor rotor (compressor rotor surface 64) but the present disclosure is not limited thereto. Furthermore, the present disclosure is not limited to engagement with any particular compressor rotor surface 64. The piston ring seal 50 is a circumferentially split ring, and thus configured to radially "grow" during operation of the gas turbine engine 20 into engagement with the compressor rotor surface. The example piston seal ring 50 shown in FIGS. 3-6 has a width (RW) and a height (RH). The width of the piston seal ring 50 is less than the width of the seal groove (i.e., W>RW) to permit axial movement of the piston axial seal within the seal groove.

During operation of the engine 20, the tie shaft 42 and the compressor rotors 36 are rotationally driven about the central axis of the engine 20; e.g., driven by the turbine 28. The rotational speed (w) of the tie shaft 42 and the compressor rotors 36 will vary within a given range during operation of a gas turbine engine 20, and the extent of the rotational speed range may vary between different gas turbine engines. In all gas turbine applications, however, the rotational speed range will include rotational speeds sufficient to cause a piston ring seal 50 to experience significant centrifugal forces forcing the piston ring seal 50 radially outward; e.g., into contact with the compressor rotor surface 64. The specific centrifugal forces on a given piston seal ring 50 will be a function of both the rotational speed and the mass of the piston ring seal 50; i.e., a first piston seal ring with a first mass (M1) will experience greater centrifugal forces than a second piston seal ring with a second mass (M2) where M1>M2, for the same rotational velocity.

As stated above, a seal assembly 46 is typically used to isolate/separate a first rotor compartment (FRC) from a second rotor compartment (SRC). Air within the FRC may be at a first pressure (P1) and temperature (T1) and air within the SRC may be at a second pressure (P2) and temperature (T2), where the first pressure and temperature are each lower than the respective second pressure and temperature (P2>P1 and T2>T1). Hence, the seal assembly 46 is operable to inhibit the passage of air from the higher pressure SRC to the lower pressure FRC.

The piston ring seal 50 is intended to create a first seal at a surface associated with the tie shaft 42 and a second seal at a compressor rotor surface 64. Using the piston ring seal 50 diagrammatically shown in FIGS. 3-5A as an example, the outer radial surface 66 of the piston ring seal 50 is intended to engage and seal with the compressor rotor surface 64 and a lateral surface 68 of the piston ring seal 50 is intended to engage and seal with the first lateral surface 52 of the seal groove 48. The first lateral surface 52 of the seal groove 48 is opposite the SRC and the higher pressure P2 in the SRC is intended to bias the piston ring seal 50 against the first lateral surface 52 to produce the seal.

Figure 5:
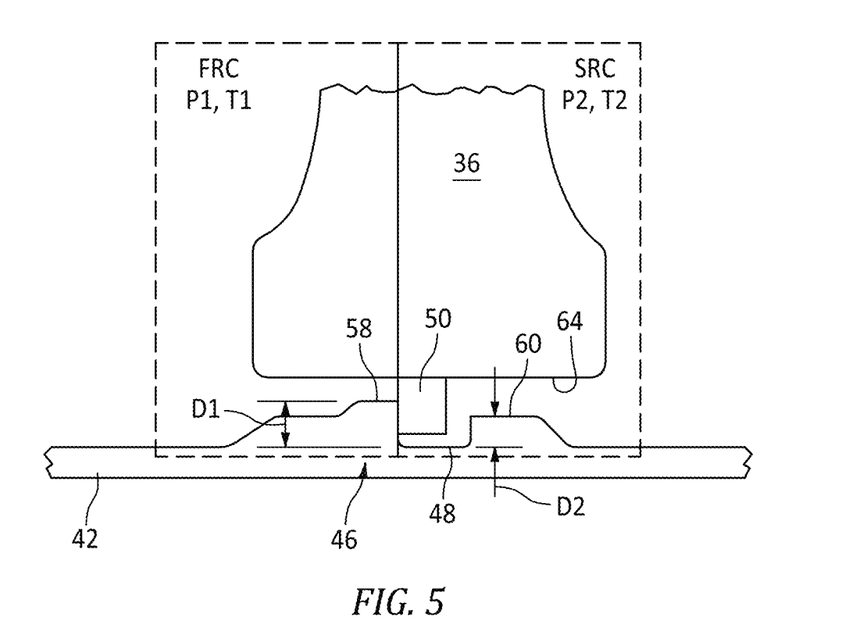
FIGS. 5 and 5A are further enlarged views of a portion of FIG. 3, illustrating a seal assembly disposed relative to a compressor rotor.
Figure 5A:
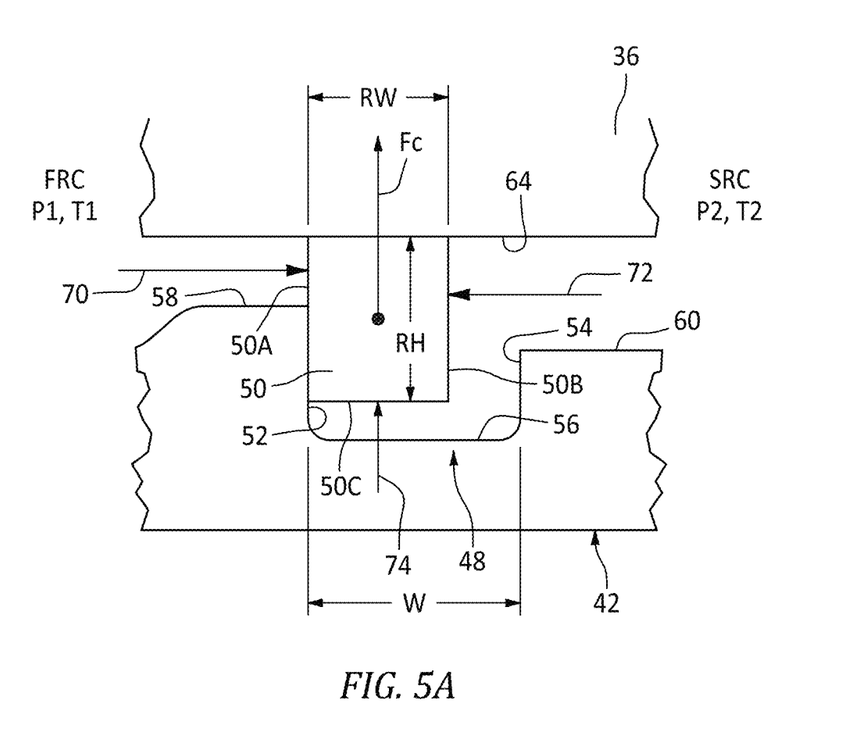

FIG. 5A is an enlarged view of the piston ring seal 50 shown in FIG. 5. During operation of the gas turbine engine 20, air within the FRC at P1 will act on the exposed portion of the lateral surface 50A of the piston ring seal 50 in the direction of arrow 70, and air within the SRC at P2 will act on the exposed portion of the lateral surface 50B of the piston ring seal 50 in the direction of arrow 72, and will act on the exposed inner radial surface 50C of the piston ring seal 50 in the direction of arrow 74. Because the air pressure in the SRC is greater than the air pressure in the FRC (P2>P1), the axial direction forces acting on the piston seal ring 50 would normally bias the piston seal ring 50 against the first lateral surface 52 of the seal groove 48 to create the desired axial sealing. Frictional forces that may impede that biasing will be discussed herein after. The air acting on the exposed inner radial surface 50C of the piston ring seal 50 in the direction of arrow 74 will bias the piston ring seal 50 radially outwardly against the compressor rotor surface 64.

Figure 6:
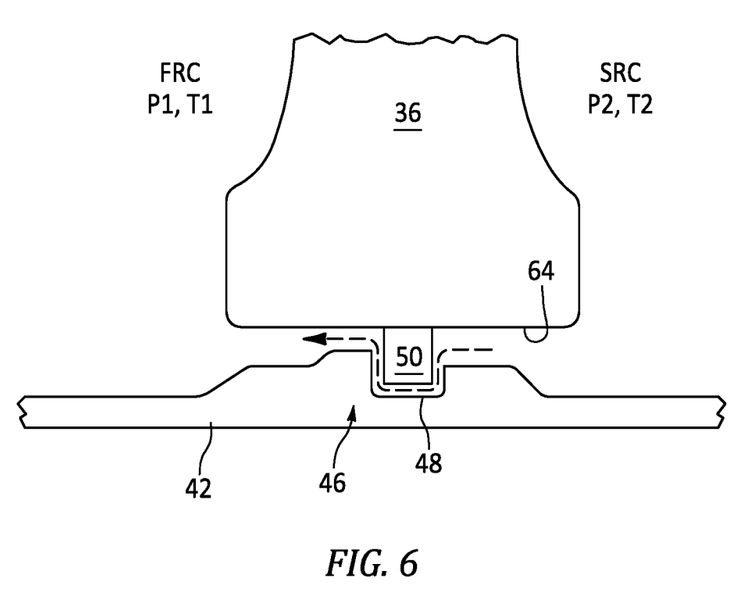
FIG. 6 is an enlarged view similar to that shown in FIG. 5, illustrating a piston ring seal in a non-sealing configuration.

In addition to the pressure force acting on the inner radial surface 50C of the piston ring seal 50 in the direction of arrow 74 (radially outward direction), the piston ring seal 50 will also be subject to centrifugal forces (Fc) during operation that bias the piston ring seal 50 radially outwardly against the compressor rotor surface 64. As stated above, the rotational speed of the tie shaft 42 and compressor rotors 36 is such that the centrifugally produced outward radial force (i.e., the force normal to the compressor rotor surface 64) can be substantial. The frictional force resisting axial movement of the piston ring seal 50 is a function of the normal force (i.e., the pressure force acting on the inner radial surface 50C of the seal plus the centrifugal force Fc) and the coefficient of friction between the seal 50 and the compressor rotor surface 64. Hence, if the radially acting normal force is great enough, the pressure difference across the seal 50 may be insufficient to permit the biasing of the piston ring seal 50 against the first lateral surface 52 of the seal groove 48 that creates the lateral seal. FIG. 6 illustrates a piston ring seal 50 that is not engaged with a lateral surface of the seal groove and the consequent leakage path around the piston ring seal 50.

Embodiments of the present disclosure provide a seal assembly 46 that mitigates the potential for leakage across the piston ring seal assembly 46 by leveraging the difference in pressure between adjacent compartments (e.g., FRC, SRC) to produce a force that counteracts the centrifugal force Fc acting on the piston ring seal 50 during operation.

Figure 7:
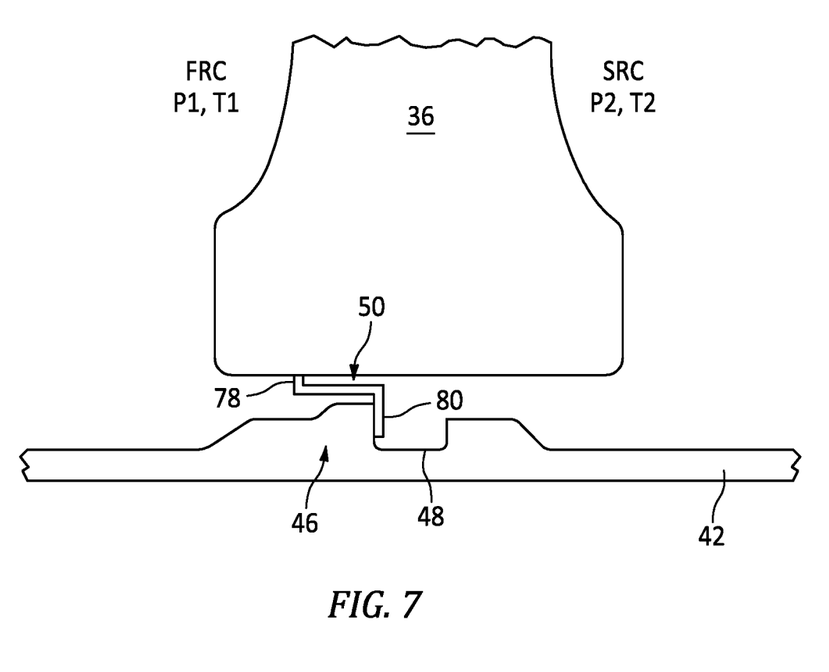
FIGS. 7 and 7A are enlarged views of a seal assembly embodiment of the present disclosure.
Figure 7A:
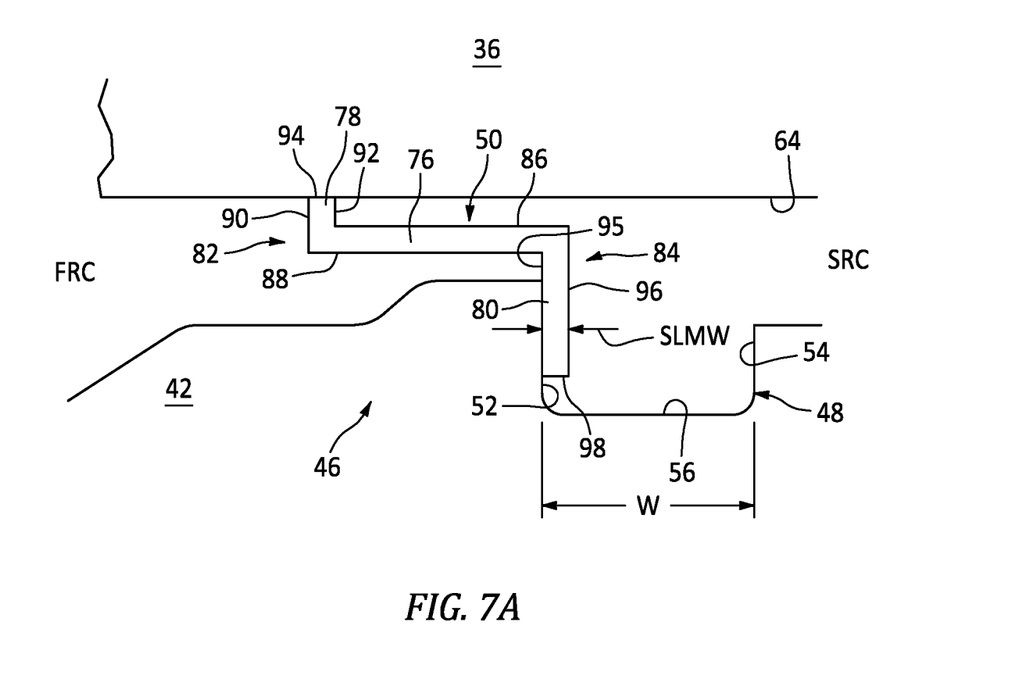

The seal assembly embodiment shown in FIGS. 7 and 7A includes a piston ring seal 50 with a stepped configuration defined by a center member 76, a first lateral member 78, and a second lateral member 80. The first and second lateral members 78, 80 are both connected to the center member 76, and all three members may be integrally formed with one another. The center member 76/seal 50 may be described as having a first lateral end 82, an opposite second lateral end 84, an outer radial surface 86, and an inner radial surface 88.

The first lateral member 78 extends outwardly from the center member 76 on the outer radial surface 86 side of the center member and at the first lateral end 82. The second lateral member 84 extends outwardly from the center member 76 on the inner radial surface 88 side of the center member 76, at the second lateral end 84 of the center member 76. The first lateral member 78 has a first side surface 90, a second side surface 92, and an outer radial surface 94. The outer radial surface 94 extends between the first and second side surfaces 90, 92. The outer radial surface 86 of the center member 76 extends between the second side surface 92 of the first lateral member 78 to the second lateral end 84 of the center member 76. The second lateral member 80 has a first side surface 95, a second side surface 96, and an inner radial surface 98. The inner radial surface 98 extends between the first and second side surfaces 95, 96. The second lateral member 80 has a width (SLMW) that extends between the first and second side surfaces 95, 96. The inner radial surface 88 of the center member 76 extends between the first side surface 95 of the second lateral member 80 to the first lateral end 82 of the center member 76. As can be seen in FIGS. 7 and 7A, the second lateral member 80 of the piston ring seal 50 is disposed within the seal groove 48 of the tie shaft 42 and the first lateral member 78 is disposed with its outer radial surface 94 in proximity to (e.g., in contact with) the compressor rotor surface 64. The second lateral member width (SLMW) is less than the width of the seal groove 48 (i.e., W>SLMW) to permit axial movement of the second lateral member 80 within the seal groove 48.

During operation of the gas turbine engine 20 with a piston seal ring 50 embodiment like that shown in FIGS. 7 and 7A, air within the FRC at P1 will act on the first side surface 90 of the first lateral member 78 and act on the inner radial surface 88 of the center member 76 and air within the SRC at P2 will act on the second side surface 96 of the second lateral member 80, the inner radial surface 98 of the second lateral member 80, and the outer radial surface 86 of the center member 76. The higher gas pressure in the SRC (P2>P1) produces axial direction forces that act on the piston seal ring 50 to bias the first side surface 95 of the second lateral member 80 against the first lateral surface 52 of the seal groove 48 to create the desired axial sealing.

In addition, the higher pressure gas (P2) in the SRC acts on the outer radial surface 86 of the center member 76 and on the inner radial surface 98 of the second lateral member 80. The axial length of the outer radial surface 86 of the center member 76 is substantially longer than the axial length of the inner radial surface 98 of the second lateral member 80. As a result, a net inwardly directed radial force ($RF_{INWARD}$) is produced. Lower pressure gas (P1) from the FRC acts on the inner radial surface 88 of the center member 76 producing an outwardly directed radial force ($RF_{OUTWARD}$). The axial lengths of the respective surfaces are chosen for given differences in pressure ($\Delta P=P2-P1$) between the FRC and the SRC to produce a net inwardly directed radial force ($RF_{INWARD}$) acting on the seal 50 that exceeds the outwardly directed radial force ($RF_{OUTWARD}$) acting on the seal 50. The net inwardly directed radial force offsets the centrifugal force (Fc) that biases the piston ring seal 50 radially outwardly (detailed above). As a result, the normal force biasing the piston ring seal 50 against the compressor surface 64 is decreased, and therefore the frictional force opposing axial movement of the piston ring seal 50 as well. The ability of the piston ring seal 50 to move axially and thereby achieve sealing with the tie shaft 52 is improved.

Figure 8:
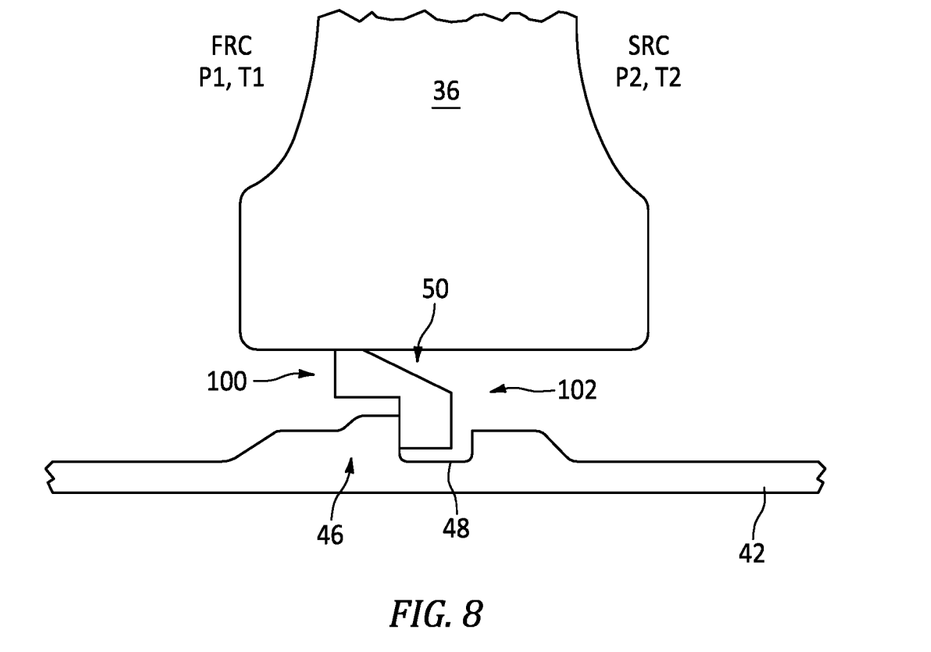
FIGS. 8 and 8A are enlarged views of a seal assembly embodiment of the present disclosure.
Figure 8A:
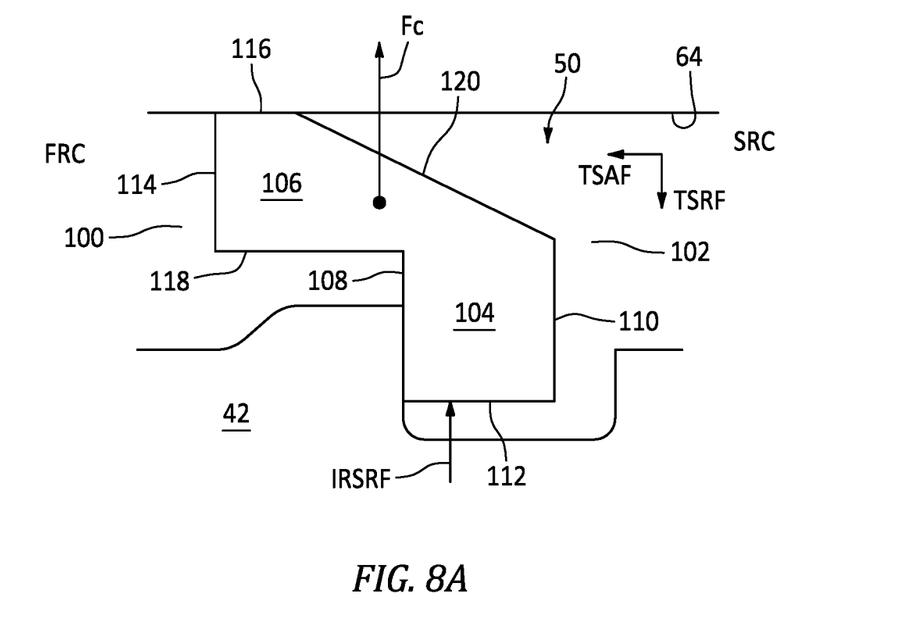

The seal assembly embodiment shown in FIGS. 8 and 8A includes a piston ring seal 50 with a first lateral end 100, a second lateral end 102 opposite the first lateral end 100, an inner lateral member 104 and an outer lateral member 106. The inner and outer lateral members 104, 106 are connected to one another and may be integrally formed with one another. The inner lateral member 104 extends outwardly from the outer lateral member 106 and is disposed at the second lateral end 102 of the seal 50. The inner lateral member 104 has a first side surface 108, a second side surface 110, and an inner radial surface 112. The inner radial surface 112 extends between the first and second side surfaces 108, 110. The outer lateral member 106 has a first side surface 114, an outer radial surface 116, an inner radial surface 118, and a transverse surface 120. The first side surface 114 extends between the inner and outer radial surfaces 116, 118. The transverse surface 120 is non-parallel with the outer radial surface 116, extending at an angle greater than zero degrees (0°) and less than ninety degrees (90°) from the outer radial surface 116, extends between outer radial surface 116 and the second side surface 110 of the inner lateral member 104; i.e., skewed relative to the axis of rotation of the tie shaft/compressor rotors. In some embodiments, the transverse surface 120 may extend at an angle in the range of about thirty degrees (30°) to about sixty degrees (60°). FIGS. 8 and 8A show the transverse surface 120 extending along a linear line. In alternative embodiments, the transverse surface 120 may include a plurality of sections; e.g., a first section disposed at a first angle (between 0-90 degrees) and a second section disposed at a second angle (between 0-90 degrees). In still further alternative embodiments, the transverse surface 120 may extend along an arcuate line and therefore be disposed at a plurality of angles. As can be seen in FIGS. 8 and 8A, the inner lateral member 104 of the piston ring seal 50 is disposed within the seal groove 48 of the tie shaft 42 and a portion of the outer radial member 106 is disposed in proximity to (e.g., in contact with) the compressor rotor surface 64.

During operation of the gas turbine engine 20 with a piston seal ring 50 embodiment like that shown in FIGS. 8 and 8A, air within the FRC at P1 will act on the first side surface 114 of the outer lateral member 106, on a portion of the first side surface 108 of the inner lateral member 104, and on the inner radial surface 118 of the outer radial member 106. Air within the SRC at P2 will act on the transverse surface 120 of the outer radial member 106, on the second side surface 110 of the inner lateral member, and on the inner radial surface 112 of the inner lateral member 104. Because the transverse surface 120 is angled, the force produced by the air at P2 acting on the transverse surface 120 will have an axial component (TSAF) and a radial component (TSRF). Hence, the higher air pressure in the SRC (P2>P1) produces axial direction forces that act on the piston seal ring 50 to bias the inner lateral member 104 against the seal groove 48 to create the desired axial sealing. In addition, the forces produced by the higher pressure air (P2) in the SRC acting on the transverse surface (TSRF) and on the inner radial surface 112 of the inner lateral member 104 (IRSRF) produce offsetting radial forces. The axial length of the transverse surface 120 is sufficiently long so that the inwardly radial force on the transverse surface 120 is greater than the radially outward force on the inner radial surface 112 of the inner lateral member 104 (TSRF>IRSRF). As a result, a net inwardly directed radial force ($RF_{INWARD}$=TSRF−IRSRF) is produced. Lower pressure gas (P1) from the FRC acts on the inner radial surface 118 of the outer lateral member 106 producing an outwardly directed radial force ($RF_{OUTWARD}$). The inwardly radial force produced by the higher pressure gas in the SRC ($RF_{INWARD}$) is greater than the outwardly directed radial force ($RF_{OUTWARD}$). The net inwardly directed radial force offsets the centrifugal force (Fc) that biases the piston ring seal 50 radially outwardly (detailed above). As a result, the normal force biasing the piston ring seal 50 against the compressor surface 64 is decreased, and therefore the frictional force opposing axial movement of the piston ring seal 50 as well. The ability of the piston ring seal 50 to move axially and thereby achieve sealing with the tie shaft 42 is improved.

Figure 9:
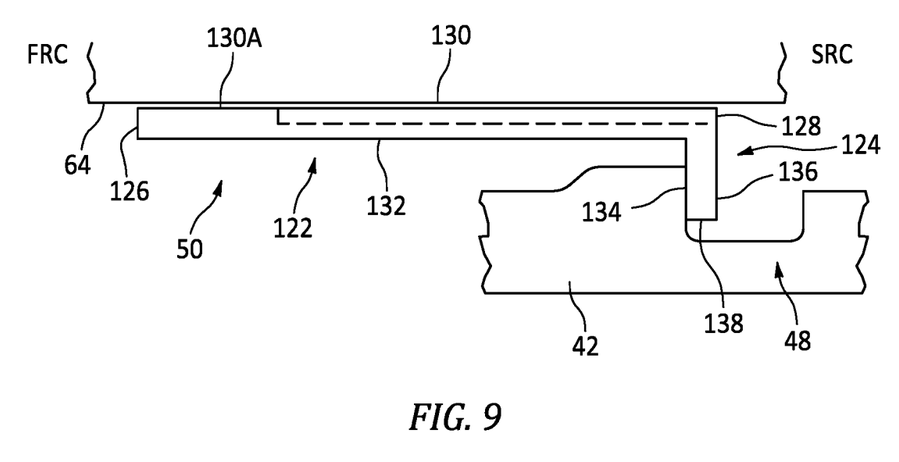
FIGS. 9 and 9A are enlarged views of a seal assembly embodiment of the present disclosure.
Figure 9A:
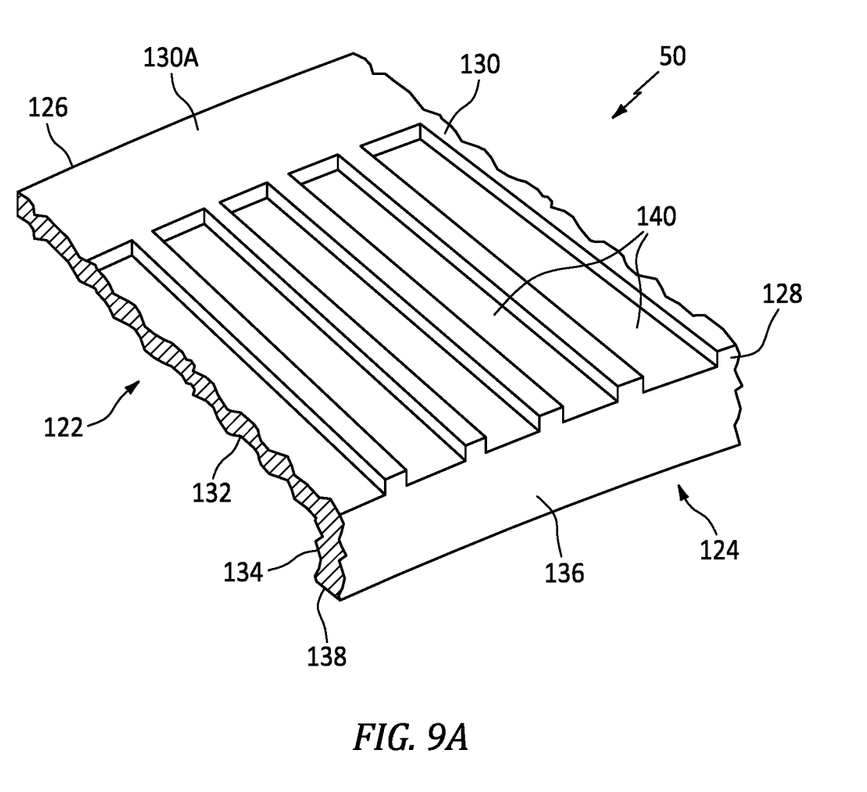

The seal assembly embodiment shown in FIGS. 9 and 9A includes a piston ring seal 50 with an L-shaped defined by a primary member 122 and a secondary member 124 connected to one another (or integrally formed). The primary member 122 may be described as having a first lateral end 126, an opposite second lateral end 128, an outer radial surface 130, and an inner radial surface 132. The secondary member 124 extends outwardly from the primary member 122 on the inner radial surface 132 side of the primary member 122 and at the second lateral end 128. The secondary member 124 has a first side surface 134, a second side surface 136, and an inner radial surface 138. The inner radial surface 138 extends between the first and second side surfaces 134, 136. The secondary member 124 has a width that is less than the width of the seal groove 48.

The primary member 122 includes a plurality of grooves 140 disposed in the outer radial surface 130 of the primary member 122. The grooves 140 are open on the second lateral end 128 and extend from the second lateral end 128 toward the first lateral end 126. The grooves 140 do not extend entirely between the first and second lateral ends 126, 128. The outer radial surface 130 includes a seal portion 130A extending between the first lateral end 126 and the terminus of the grooves 140. As can be seen in FIG. 9, the secondary member 124 is disposed within the seal groove 48 of the tie shaft 42 and portions of the outer radial surface 130 (including the seal portion 130A) are in contact with the compressor rotor surface 64.

During operation of the gas turbine engine 20 with a piston seal ring 50 embodiment like that shown in FIGS. 9 and 9A, air within the FRC (at P1) and the SRC (at P2) will act in the manner described above. In this embodiment, air from the SRC at P2 will enter the grooves 140 and acts on the piston ring seal 50 to create an inwardly directed radial force. As a result, the normal force biasing the piston ring seal 50 against the compressor surface 64 is decreased, and therefore the frictional force opposing axial movement of the piston ring seal 50 as well. The ability of the piston ring seal 50 to move axially and thereby achieve sealing with the tie shaft 52 is improved.

The embodiments shown in FIGS. 7, 7A, 8, 8A, 9, and 9A are examples of piston ring seal 50 configurations that leverage the difference in pressure between the rotor compartments to produce a force that counteracts the centrifugal force Fc acting on the piston ring seal 50 during operation. These example embodiments illustrate how a present disclosure piston ring seal 50 may be configured. The present disclosure is not limited to these examples.

The piston split ring seal 50 of the present disclosure may be comprised of a variety of different materials; e.g., various metals, metal alloys, ceramics, polymers, and any combination thereof.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A gas turbine engine rotor assembly, comprising:
   a shaft rotatable about an axis, the shaft having an outer shaft surface;

a rotor surrounding the shaft and rotatable with the shaft about the axis, the rotor having an axially extending inner rotor surface; and a seal assembly configured to seal between a first rotor compartment (FRC) disposed between the shaft and the rotor on a first side of the seal assembly, and a second rotor compartment (SRC) disposed between the shaft and the rotor on a second side of the seal assembly, the second side of the seal assembly being axially opposite the first side of the seal assembly, wherein during operation of the gas turbine engine rotor assembly air is disposed the FRC at a pressure P1 and air is disposed the SRC at a pressure P2, where P2 is greater than P1, the seal assembly including:

a seal groove disposed radially into the outer shaft surface, the seal groove having a first lateral surface, a second lateral surface spaced apart from the first lateral surface, and a base surface extending between the first lateral surface and the second lateral surface, the seal groove having a width and a depth; and a split piston ring seal having a first lateral member configured for engagement with the inner rotor surface, and a second lateral member configured to be at least partially disposed within the seal groove;

wherein the split piston ring seal is configured such that air disposed in the FRC at said pressure P1 produces a first axial force (FAF) acting on the split piston ring seal, and air disposed in the SRC at said pressure P2 produces a second axial force (SAF) acting on the split piston ring seal, wherein the SAF is directed opposite to the FAF and the SAF is greater than the FAF;

wherein the split piston ring seal is configured such that air disposed in the FRC at said pressure P1 produces a first radial force (FRF) acting on the split piston ring seal, and air disposed in the SRC at said pressure P2 produces a second radial force (SRF) acting on the split piston ring seal, wherein the SRF is directed radially inward and the FRF is directed radially outward, and the SRF is greater than the FRF.

2. The gas turbine engine rotor assembly of claim 1, wherein the first lateral member includes a first side surface (FLMFSS), a second side surface (FLMSSS), an outer radial surface (FLMORS) that extends between the FLMFSS and the FLMSSS.

3. The gas turbine engine rotor assembly of claim 2, wherein the second lateral member includes a first side surface (SLMFSS), a second side surface (SLMSSS), and an inner radial surface (SLMIRS) that extends axially between the SLMFSS and the SLMSSS.

4. The gas turbine engine rotor assembly of claim 3, wherein the split piston ring seal further comprises a center member having a first lateral end and a second lateral end, and the first lateral member extends outwardly from the center member at the first lateral end, and the second lateral member extends outwardly from the center member at the second lateral end.

5. The gas turbine engine rotor assembly of claim 4, wherein the split piston ring seal is configured such that the FLMFSS of the first lateral member, and the inner radial surface of the center member are exposed to the air disposed in the FRC at said pressure P1.

6. The gas turbine engine rotor assembly of claim 5, wherein the split piston ring seal is configured such that the SLMSSS of the second lateral member, and the outer radial surface of the center member are exposed to the air disposed in the SRC at said pressure P2.

7. The gas turbine engine rotor assembly of claim 1, wherein the second lateral member includes a first side surface (SLMFSS), a second side surface (SLMSSS), and an inner radial surface (SLMIRS) that extends axially between the SLMFSS and the SLMSSS.

8. The gas turbine engine rotor assembly of claim 7, wherein the first lateral member includes a first side surface (FLMFSS), a transverse surface (FLMTS), an outer radial surface (FLMORS) that extends between the FLMFSS and the FLMTS, and the FLMTS extends between the FLMORS and the SLMSSS.

9. The gas turbine engine rotor assembly of claim 8, wherein the FLMTS extends between the FLMORS and the SLMSSS at an angle greater than zero degrees and less than ninety degrees relative to the FLMORS.

10. The gas turbine engine rotor assembly of claim 8, wherein the FLMTS includes a plurality of sections, each disposed at an angle greater than zero degrees and less than ninety degrees relative to the FLMORS.

11. A method of sealing between a first rotor compartment (FRC) disposed between a shaft and a rotor, and a second rotor compartment (SRC) disposed between the shaft and the rotor, the method comprising:

providing a seal assembly configured to seal between the FRC and the SRC, the seal assembly including a seal groove disposed radially into an outer shaft surface of the shaft, and a split piston ring seal having a first lateral member configured for engagement with an inner rotor surface of the rotor, and a second lateral member configured to be at least partially disposed within the seal groove; and providing air in the FRC at a pressure P1 and air in the SRC at a pressure P2, where P2 is greater than P1;

wherein the split piston ring seal is configured such that for the difference in pressure between P2 and P1, the air pressure P1 in the FRC produces a first radial force (FRF) acting on the split piston ring seal, and air pressure P2 in the SRC produces a second radial force (SRF) acting on the split piston ring seal, wherein the SRF is directed radially inward and the FRF is directed radially outward, and the SRF is greater than the FRF.

12. The method of claim 11, wherein the split piston ring seal further includes a first lateral end, a second lateral end, and a center member extending between the first lateral end and the second lateral end;

wherein the first lateral member extends outwardly from the center member at the first lateral end, and the second first lateral member extends outwardly from the center member at the first lateral end.

13. The method of claim 12, wherein the first lateral member includes a first side surface (FLMFSS), a second side surface (FLMSSS), and an outer radial surface (FLMORS) that extends between the FLMFSS and the FLMSSS, and the second lateral member includes a first side surface (SLMFSS), a second side surface (SLMSSS), and an inner radial surface (SLMIRS) that extends axially between the SLMFSS and the SLMSSS.

14. The method of claim 12, wherein the split piston ring seal is configured such that the FLMFSS of the first lateral member, and the inner radial surface of the center member are exposed to the air disposed in the FRC at said pressure P1, and the SLMSSS of the second lateral member, and the outer radial surface of the center member are exposed to the air disposed in the SRC at said pressure P2.

15. The method of claim 11, wherein the second lateral member includes a first side surface (SLMFSS), a second side surface (SLMSSS), and an inner radial surface (SLMIRS) that extends axially between the SLMFSS and the SLMSSS, and the first lateral member includes a first side surface (FLMFSS), a transverse surface (FLMTS), an outer radial surface (FLMORS) that extends between the FLMFSS and the FLMTS, and the FLMTS extends between the FLMORS and the SLMSSS.

* * * * *